United States Patent
Hirschler et al.

(10) Patent No.: US 9,905,147 B2
(45) Date of Patent: Feb. 27, 2018

(54) DISPLAY DEVICE

(71) Applicant: Infineon Technologies AG, Neubiberg (DE)

(72) Inventors: Joachim Hirschler, Villach (AT); Johann Schmid, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/832,506

(22) Filed: Aug. 21, 2015

(65) Prior Publication Data

US 2015/0356907 A1 Dec. 10, 2015

Related U.S. Application Data

(63) Continuation of application No. 13/903,872, filed on May 28, 2013, now Pat. No. 9,135,893.

(51) Int. Cl.
| | |
|---|---|
| *G09G 3/20* | (2006.01) |
| *G06F 3/01* | (2006.01) |
| *G09G 5/391* | (2006.01) |
| *G09G 3/00* | (2006.01) |
| *G02B 27/02* | (2006.01) |

(52) U.S. Cl.
CPC ......... *G09G 3/2007* (2013.01); *G02B 27/026* (2013.01); *G06F 3/013* (2013.01); *G09G 3/003* (2013.01); *G09G 5/391* (2013.01); *G09G 2354/00* (2013.01)

(58) Field of Classification Search
CPC combination set(s) only.
See application file for complete search history.

(56) References Cited

U.S. PATENT DOCUMENTS

| | | | |
|---|---|---|---|
| 5,625,493 A * | 4/1997 | Matsumura | G02B 27/0172 359/630 |
| 5,790,297 A | 8/1998 | Berlin | |
| 6,501,602 B2 | 12/2002 | Togino et al. | |
| 7,048,372 B1 * | 5/2006 | Cohen | G02C 1/04 351/103 |
| 7,400,353 B2 | 7/2008 | Hatano | |
| 7,944,617 B2 | 5/2011 | Ishioka et al. | |
| 8,351,124 B2 | 1/2013 | Togino | |
| 2003/0025849 A1 | 2/2003 | Hara | |

(Continued)

FOREIGN PATENT DOCUMENTS

| | | |
|---|---|---|
| CN | 1604625 A | 4/2005 |
| CN | 1925813 A | 3/2007 |

(Continued)

*Primary Examiner* — Van Chow
(74) *Attorney, Agent, or Firm* — Slater Matsil, LLP

(57) ABSTRACT

A display device is provided. The display device comprises a display comprising a plurality of pixels arranged in a display plane. The display device is configured to determine a virtual plane at which a long-sighted user of the display device who is looking at the display sees sharp. Further, the display device is configured to determine a first contiguous group of pixels of the display which are located within a first optical path from a first virtual pixel of the virtual plane to an eye of the long-sighted user, and to determine a second contiguous group of pixels of the display which are located within a second optical path from a second virtual pixel of the virtual plane to the eye of the long-sighted user.

12 Claims, 8 Drawing Sheets

(56) References Cited

U.S. PATENT DOCUMENTS

| | | | |
|---|---|---|---|
| 2005/0073471 A1* | 4/2005 | Selbrede | G02F 1/1347 345/4 |
| 2005/0134699 A1* | 6/2005 | Nagashima | G02B 13/0055 348/218.1 |
| 2008/0046076 A1* | 2/2008 | Rombach | A61F 2/1632 623/6.34 |
| 2009/0180180 A1 | 7/2009 | Shimshi et al. | |
| 2011/0273528 A1* | 11/2011 | Sazawa | G06T 15/20 348/36 |
| 2012/0313839 A1* | 12/2012 | Smithwick | G02B 27/2214 345/6 |
| 2013/0329120 A1* | 12/2013 | Hiasa | H04N 5/23212 348/345 |

FOREIGN PATENT DOCUMENTS

| | | |
|---|---|---|
| CN | 101102411 A | 1/2008 |
| CN | 101794021 A | 8/2010 |
| CN | 102109668 A | 6/2011 |
| CN | 202018539 U | 10/2011 |
| CN | 102880337 A | 1/2013 |
| CN | 202750184 U | 2/2013 |

\* cited by examiner

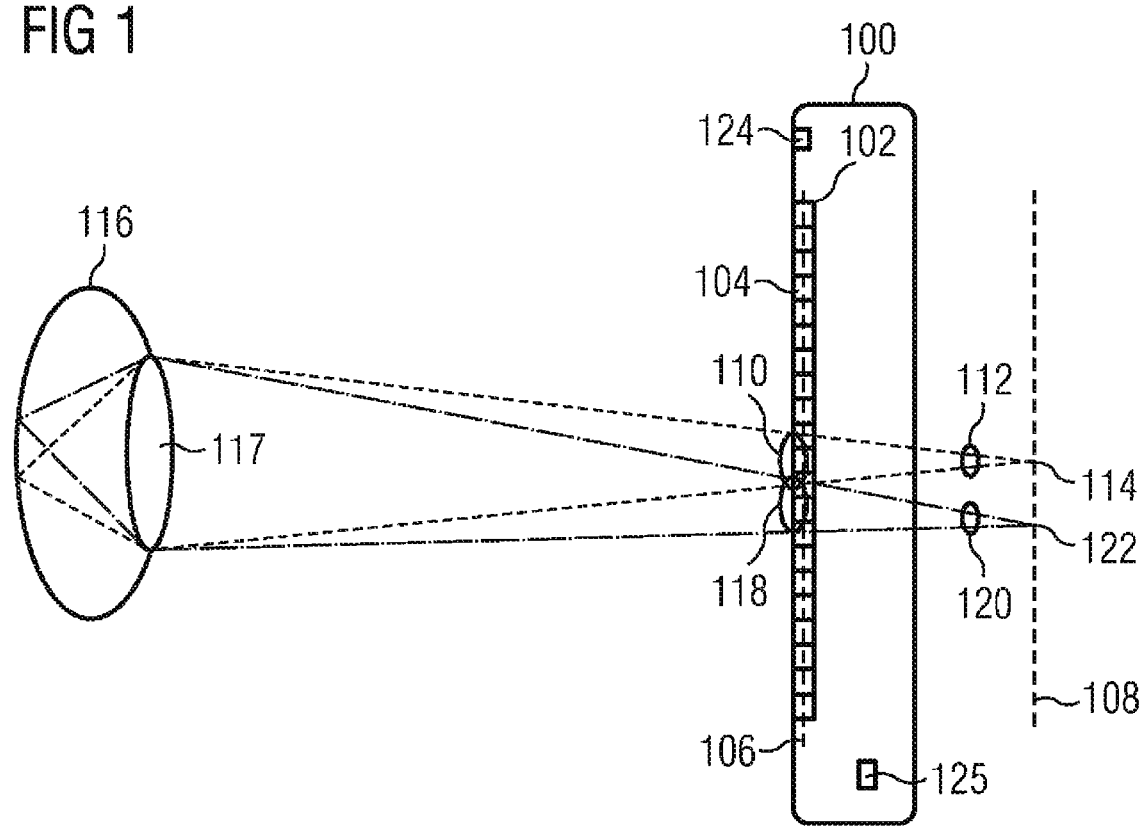

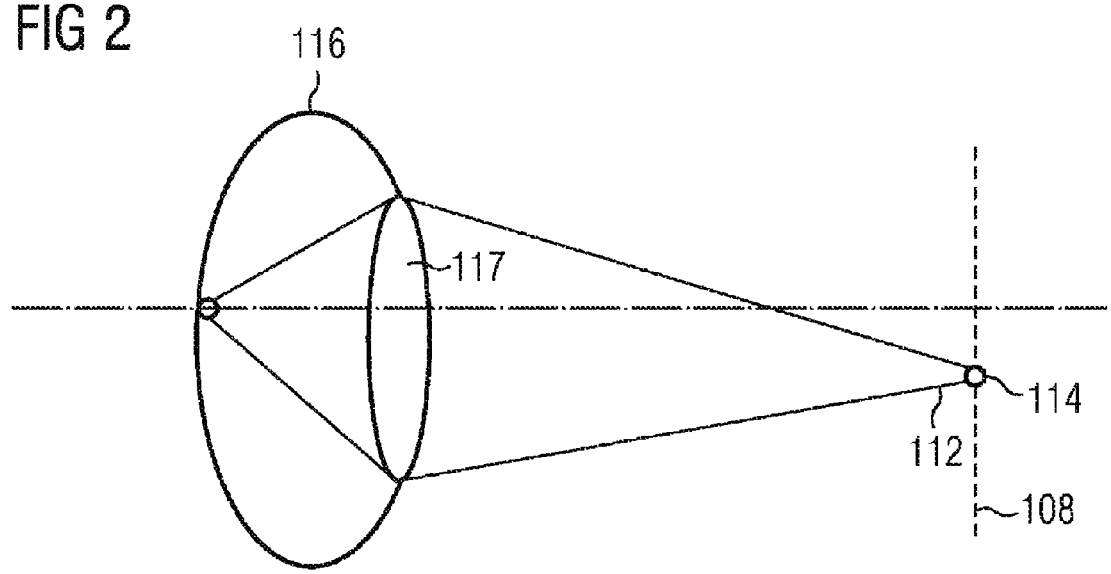
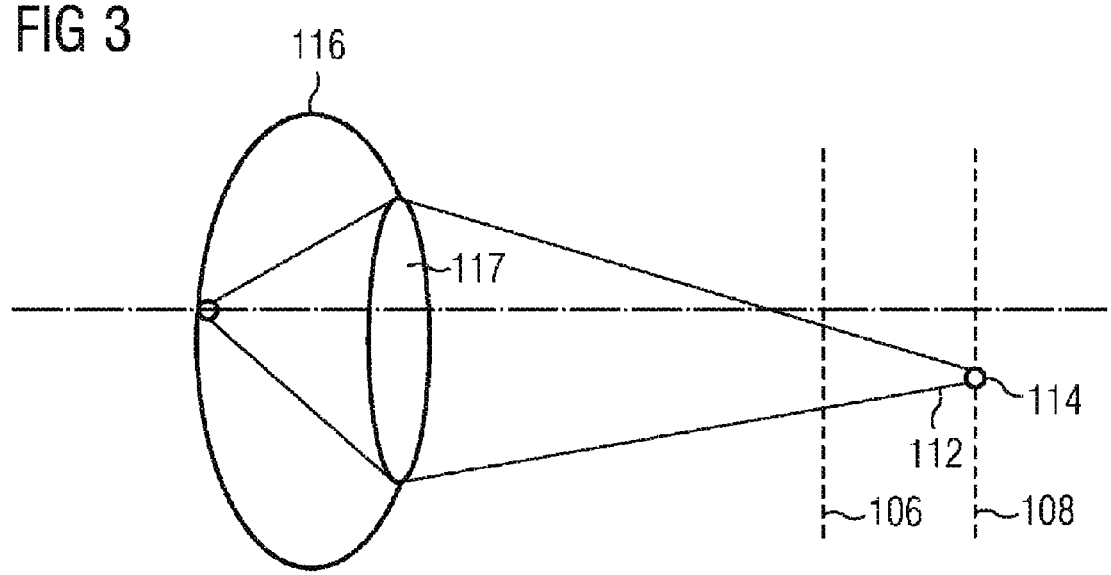

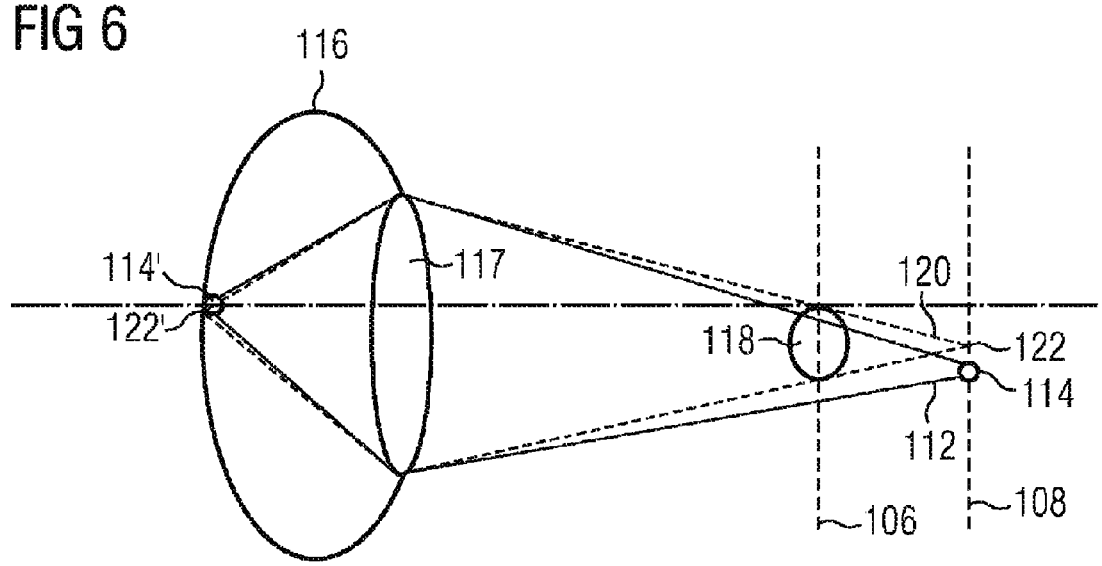
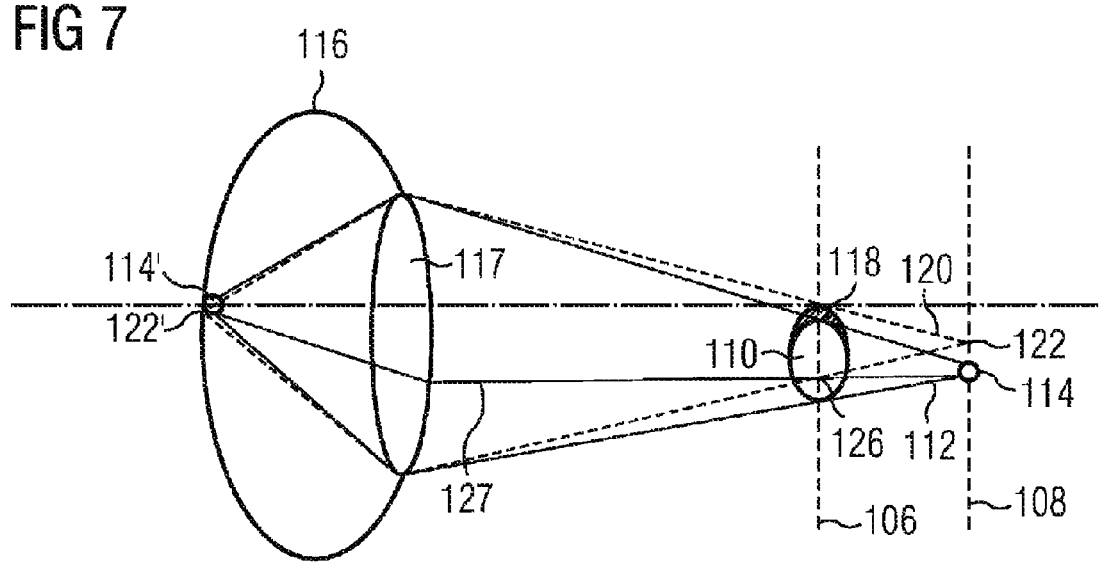

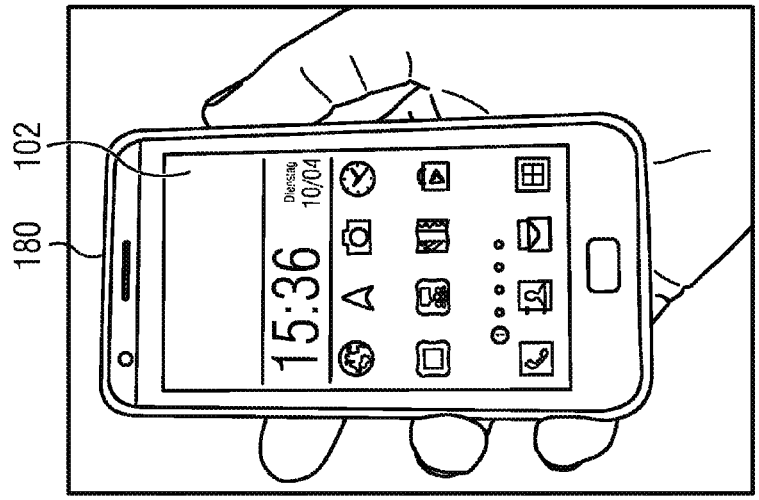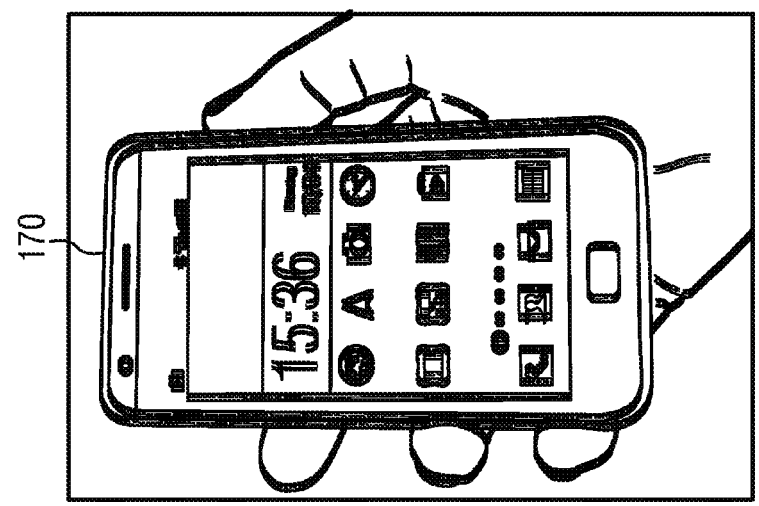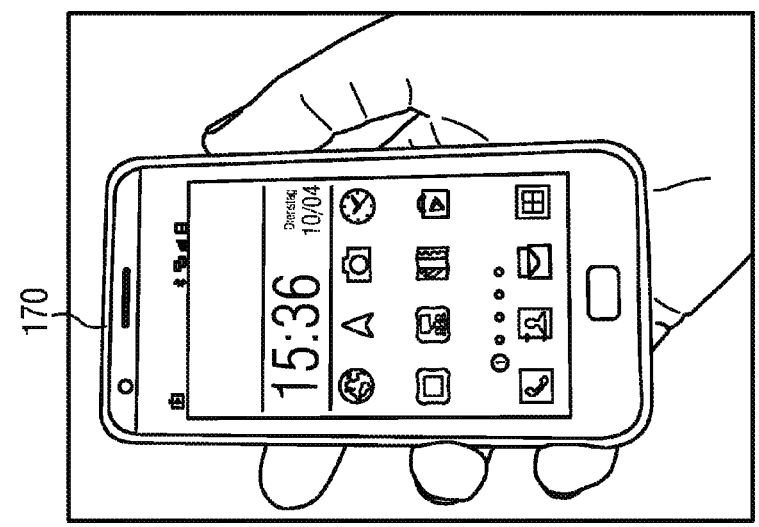

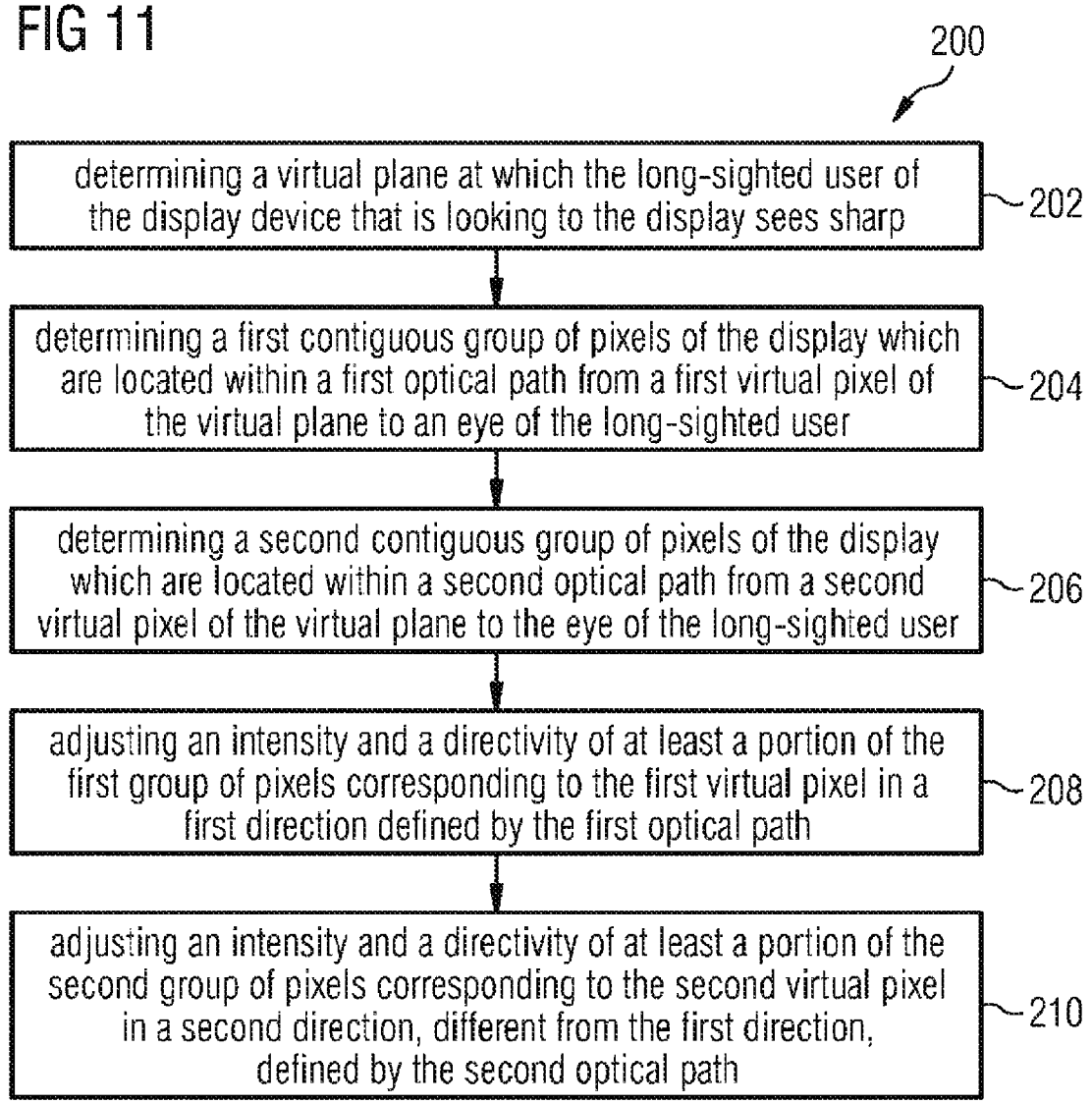

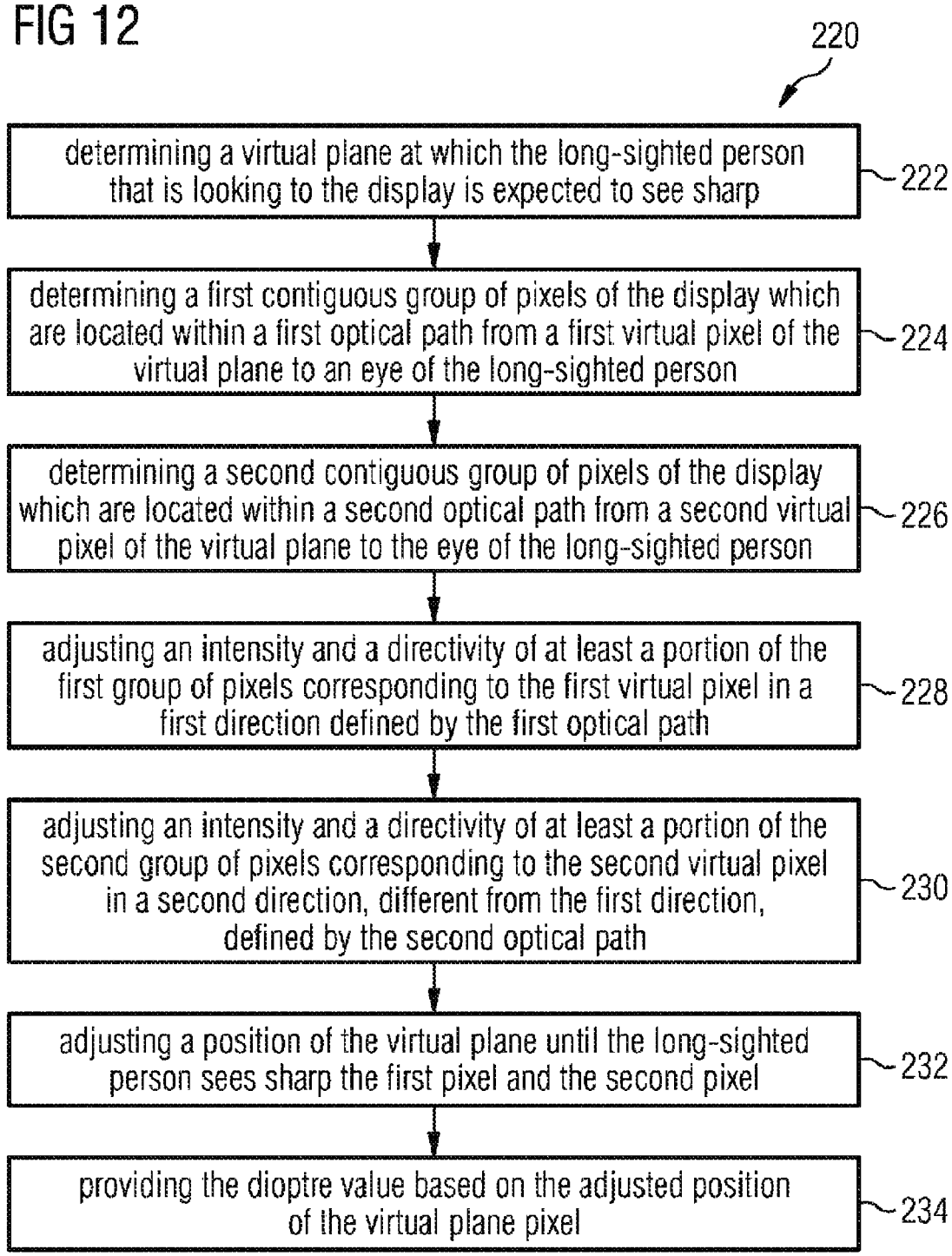

DISPLAY DEVICE

This is a continuation application of U.S. application Ser. No. 13/903,872, entitled "Display Device" which was filed on May 28, 2013 and is incorporated herein by reference.

TECHNICAL FIELD

Embodiments relate to a display device. Some embodiments relate to a portable device comprising a display device. Some embodiments relate to a method for operating a display device. Some embodiments relate to a method for determining a dioptre value of a long-sighted person.

BACKGROUND

Using smartphones for hyperopic or long-sighted eye persons is a problem. Due to insufficient accommodation of the eye it is not possible to see in reading distance in a sharp and reliable way.

Currently the only solution to compensate hyperopic-eyes is putting on reading glasses. One disadvantage is quite often reading glasses are not directly available or are not useful in the actual situation. On the other hand reading glasses may not be liked to be used due to aesthetic reasons.

SUMMARY OF THE INVENTION

A display device is provided. The display device comprises a display comprising a plurality of pixels arranged in a display plane. The display device is configured to determine a virtual plane at which a long-sighted user of the display device who is looking at the display sees sharp. Further, the display device is configured to determine a first contiguous group of pixels of the display which are located within a first optical path from a first virtual pixel of the virtual plane to an eye of the long-sighted user, and to determine a second contiguous group of pixels of the display which are located within a second optical path from a second virtual pixel of the virtual plane to the eye of the long-sighted user. Further, the display device is configured to adjust an intensity and a directivity (or emission angle) of at least a portion of the first group of pixels corresponding to the first virtual pixel in a first direction defined by the first optical path, and to adjust an intensity and directivity (or emission angle) of at least a portion of the second group of pixels corresponding to the second virtual pixel in a second direction, different from the first direction, defined by the second optical path.

A portable device comprising a display device is provided. The display device comprises a display comprising a plurality of pixels arranged in a display plane. The display device is configured to determine a virtual plane at which a long-sighted user of the display device who is looking at the display sees sharp. Further, the display device is configured to determine a first contiguous group of pixels of the display which are located within a first optical path from a first virtual pixel of the virtual plane to an eye of the long-sighted user, and to determine a second contiguous group of pixels of the display which are located within a second optical path from a second virtual pixel of the virtual plane to the eye of the long-sighted user. Further, the display device is configured to adjust an intensity and a directivity (or emission angle) of at least a portion of the first group of pixels corresponding to the first virtual pixel in a first direction defined by the first optical path, and to adjust an intensity and directivity (or emission angle) of at least a portion of the second group of pixels corresponding to the second virtual pixel in a second direction, different from the first direction, defined by the second optical path.

A method for operating a display device is provided. The display device comprises a display comprising a plurality of pixels arranged in a display plane. The method comprises determining a virtual plane at which a long-sighted user of the display device who is looking at the display sees sharp. Further, the method comprises determining a first contiguous group of pixels of the display which are located within a first optical path from a first virtual pixel of the virtual plane to an eye of the long-sighted user, and determining a second contiguous group of pixels of the display which are located within a second optical path from a second virtual pixel of the virtual plane to the eye of the long-sighted user. Further, the method comprises adjusting an intensity and a directivity (or emission angle) of at least a portion of the first group of pixels corresponding to the first virtual pixel in a first direction defined by the first optical path, and adjusting an intensity and a directivity (or emission angle) of at least a portion of the second group of pixels corresponding to the second virtual pixel in a second direction, different from the first direction, defined by the second optical path.

A method for determining a dioptre value of a long-sighted person using a display device is provided. The display device comprises a display comprising a plurality of pixels arranged in a display plane. The method comprises determining a virtual plane at which the long-sighted person who is looking at the display is expected to see sharp. Further, the method comprises determining a first contiguous group of pixels of the display which are located within a first optical path from a first virtual pixel of the virtual plane to an eye of the long-sighted person, and determining a second contiguous group of pixels of the display which are located within a second optical path from a second virtual pixel of the virtual plane to the eye of the long-sighted person. Further, the method comprises adjusting an intensity and a directivity (or emission angle) of at least a portion of the first group of pixels corresponding to the first virtual pixel in a first direction defined by the first optical path, and adjusting an intensity and a directivity (or emission angle) of at least a portion of the second group of pixels corresponding to the second virtual pixel in a second direction, different from the first direction, defined by the second optical path. Further, the method comprises adjusting a position of the virtual plane until the long-sighted person sees sharp the first pixel and the second pixel. Further, the method comprises providing the dioptre value based on the adjusted position of the virtual plane.

BRIEF DESCRIPTION OF THE DRAWINGS

Embodiments of the present invention are described herein making reference to the appended drawings.

FIG. 1 shows an illustrative sight-view of a display device;

FIG. 2 shows an illustrative view of an eye of a long-sighted person and the plane at which the eye of the long-sighted person sees sharp;

FIG. 3 shows an illustrative view of the eye of the long-sighted user and the plane at which the eye of the longsighted user sees sharp;

FIG. 6 shows an illustrative view of the eye of the long-sighted user, the plane at which the eye of the long-sighted user sees sharp and the display plane of the display of the display device;

FIG. 7 shows an illustrative view of the eye of the long-sighted user, the plane at which the eye of the long-sighted user sees sharp and the display plane of the display of the display device;

FIG. 10A shows an exemplary image of a conventional smartphone from the view of a normal-sighted eye;

FIG. 10B shows an exemplary image of the conventional smartphone from the view of a long-sighted eye;

FIG. 10C shows an exemplary image of a smartphone implementation of the portable device shown in FIG. 9;

FIG. 11 shows a flowchart of a method for operating a display device; and

FIG. 12 shows a flowchart of a method for determining a dioptre value of a long-sighted person using a display device.

Figure 4:
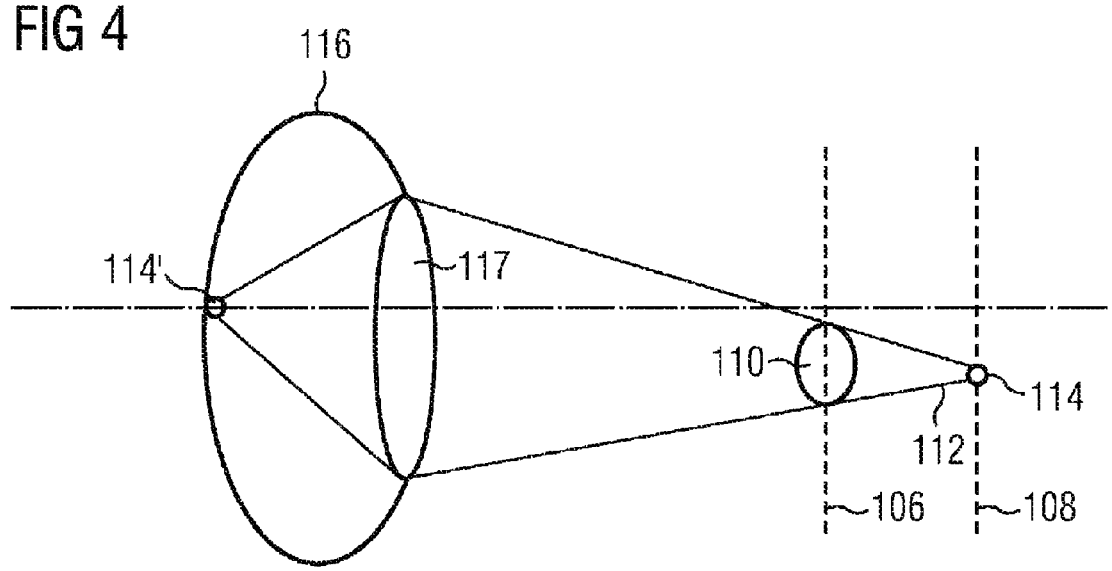
FIG. 4 shows an illustrative view of the eye of the long-sighted user, the plane at which the eye of the long-sighted user sees sharp and the display plane of the display of the display device.

Equal or equivalent elements or elements with equal or equivalent functionality are denoted in the following description by equal or equivalent reference numerals.

DETAILED DESCRIPTION OF ILLUSTRATIVE EMBODIMENTS

In the following description, a plurality of details are set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows an illustrative sight-view of a display device 100. The display device 100 comprises a display 102 having a plurality of pixels 104 arranged in a display plane 106.

The display device 100 is configured to determine a virtual plane 108 at which a long-sighted user of the display device 100 who is looking at the display 102 sees sharp, i.e., the image appears sharp to the user. The display device 100 is configured to determine a first contiguous group 110 of pixels 104 of the display 102 which are located within a first optical path 112 from a first virtual pixel 114 of the virtual plane 108 to an eye 116 of the long-sighted user, and to determine a second contiguous group 118 of pixels 104 of the display 102 which are located within a second optical path 120 from a second virtual pixel 122 of the virtual plane 108 to the eye 116 of the long-sighted user.

Further, the display device 100 is configured to adjust an intensity and a directivity (or emission angle) of at least a portion of the first group 110 of pixels 104 corresponding to the first virtual pixel 114 in a first direction defined by the first optical path 112, and to adjust an intensity and a directivity (or emission angle) of at least a portion of the second group 118 of pixels 104 corresponding to the second virtual pixel 122 in a second direction, different from the first direction, defined by the second optical path 120.

Thereby, the display device 100 may compensate the hyperopic (long-sighted) eye of the user of the display device 100 by reproducing the first virtual pixel 114, which is located at the plane 108 at which the long-sighted user sees sharp, by adjusting the intensity and the directivity of at least a portion of the first contiguous group 110 of pixels 104 corresponding to the first virtual pixel 114, and by reproducing the second virtual pixel 122, which is located at the plane 108 at which the long-sighted user sees sharp, by adjusting the intensity and the directivity of at least a portion of the second contiguous group 118 of pixels 104 corresponding to the second virtual pixel 122. In other words, a human hyperopic (long-sighted) eye can be compensated by utilizing angular dependent light emission at the display 102.

As shown in FIG. 1, the first optical path 112 may comprise the form (or shape) of a conus which extends from the first virtual pixel 114 to a lens 117 of the eye 116 of the long-sighted user of the display device 100. Just as well the second optical path 120 may comprise the form (or shape) of a conus which extends from the second virtual pixel 120 to the lens 117 of the eye 116 of the long-sighted user of the display device 100.

Thereby, the first optical path 112 may intercept the display plane 106 in a first area (or region) of the display plane 106, wherein the second optical path 120 may intercept the display plane 106 in a second area (or region) of the display plane 106. The first contiguous group 110 of pixels may be the pixels 104 of the display 102 which are located within the first area of the display plane 106, wherein the second contiguous group 118 of pixels 104 may be the pixels 104 of the display 102 which are located within the second area of the display plane.

Note that the first area of the display plane 106 at which the first optical path 112 intercepts the display plane 106, and the second area of the display plane 106 at which the second optical path 120 intercepts the display plane 106 may overlap in an overlap area.

Thus, pixels 104 of the display 102 which are located within this overlap area may be used to reproduce both, the first virtual pixel 114 and the second virtual pixel 122.

Therefore, the display device 100 may be configured to select a first number of the pixels which are located within this overlap area to reproduce the first virtual pixel (i.e., to adjust the intensity and the directivity of the first number of the pixels in the first direction to reproduce the first virtual pixel, or in other words, to adjust the intensity and the emission angle of the first number of the pixels in order to reproduce the first virtual pixel), and to select a second number of the pixels, different from the first number of the pixels, which are located within this overlap area to reproduce the second virtual pixel 122 (i.e., to adjust the intensity and directivity of the second number of the pixels in the second direction to reproduce the second virtual pixel 122, or in other words, to adjust the intensity and the emission angle of the second number of the pixels in order to reproduce the second virtual pixel 122).

In other words, the display device 100 may be configured to adjust the intensity and the directivity of only a portion of the first contiguous group 110 of pixels 104 corresponding to the first virtual pixel 114 in order to reproduce the first virtual pixel 114 via the first contiguous group 110 of pixels 104, and to adjust the intensity and directivity of only a portion of the second contiguous group of pixels 118, different from the portion of the first contiguous group 110 of pixels 104, corresponding to the second virtual pixel 122 in order to reproduce the second virtual pixel 122 via the second contiguous group 118 of pixels 104.

Moreover, the device 100 can be configured to adjust the intensity and the directivity of at least a portion of the first contiguous group 110 of pixels 104 during a first time period, and to adjust the intensity and the directivity of at least the portion of the second contiguous group 110 of pixels 104 during a second time period, different from the first time period.

For example, the display device 100 can be configured to reproduce the first virtual pixel 114 in (or during) the first time period by adjusting, in (or during) the first time period, the intensity and the directivity of at least the portion of the first contiguous group 110 of pixels 104 corresponding to the first virtual pixel 114 in order to reproduce the first virtual pixel 114, and to reproduce the second virtual pixel 122 in (or during) the second time period, different from the first time period, by adjusting, in (or during) the second time period, the intensity and the directivity of at least the portion of the second contiguous group 118 of pixels 104 corresponding to the second virtual pixel 122 in order to reproduce the second virtual pixel 122.

The display device 100 may comprise a sensor 124 for detecting a position of the eye 116 of the long-sighted user of the display device 100. Thereby, the display device 100 can be configured to determine the first optical path 112 and the second optical path 120 based on the detected position of the eye 116 of the long-sighted user.

Naturally, the sensor 124 of the display device 100 may also be configured to detect a position of a first eye and a position of a second eye of the of the long-sighted user of the display device 100, and to detect first optical paths from the first virtual pixel of the virtual plane to the first and second eyes of the long-sighted user, and to detect second optical paths from the second virtual pixel of the virtual plane to the first and second eyes of the long-sighted user.

For example, the sensor 124 may be a camera of the display device 100 or an external camera that is connected to the display device 100. Further, the position of the eye 116 of the long-sighted user may be a relative position of the eye 116 of the long-sighted user with respect to the display plane 106 of the display 102 of the display device 100 or the virtual plane 108. Further, the position of the eye 116 of the long-sighted user may be described by a vector between the eye 116 of the long-sighted user and a reference point of the display device 100, such as a center or edge of the display 102, or of the sensor 124.

Moreover, the display device 100 may be configured to determine the virtual plane 108 such that the display plane 106 and the virtual plane 108 are parallel to each other.

In the following it is described in detail how a human hyperopic eye can be compensated by utilizing an angular dependent light emission at the display 102 as it is implemented by the above described display device 100.

FIG. 2 shows an illustrative view of the eye 116 of the long-sighted user and the plane 108 at which the eye 116 of the longsighted user sees sharp. Further, in FIG. 2 a first spot 114 having a first intensity and/or color is shown. The first spot 114 is located at a first position at the plane 108 at which the eye 116 of the longsighted user sees sharp. In other words, in FIG. 2 focusing on a first spot 114 is shown.

For example, the first spot 114 can be a light spot. First rays (e.g., light rays) which come from the first spot 114 (e.g., light spot) travel through the eyeball lens 117 and reach the eyeball backplane. Thereby, it is assumed that the plane 108 with the first spot 114 is far enough in its distance to be seen sharply, even for a long-sighted (hyperopic) person.

FIG. 3 shows an illustrative view of the eye 116 of the long-sighted user, the plane 108 at which the eye of the long-sighted user sees sharp. If a plane 106 is introduced more closely, e.g., the display plane 106 of the display 102 of the display device 100 (e.g., a smartphone), the eye 116 of the long-sighted user is not able to accommodate this, and any picture is not sharp anymore.

FIG. 4 shows an illustrative view of the eye 116 of the long-sighted user, the plane 108 at which the eye of the long-sighted user sees sharp and the display plane 106 of the display 102 of the display device 100. To get a first spot 114' (e.g., a light spot) on the eyeball backplane, the display 102 of the display device 100 may emit first information (e.g., light information or white information) from a first larger region 110, as indicated in FIG. 4.

Figure 5:
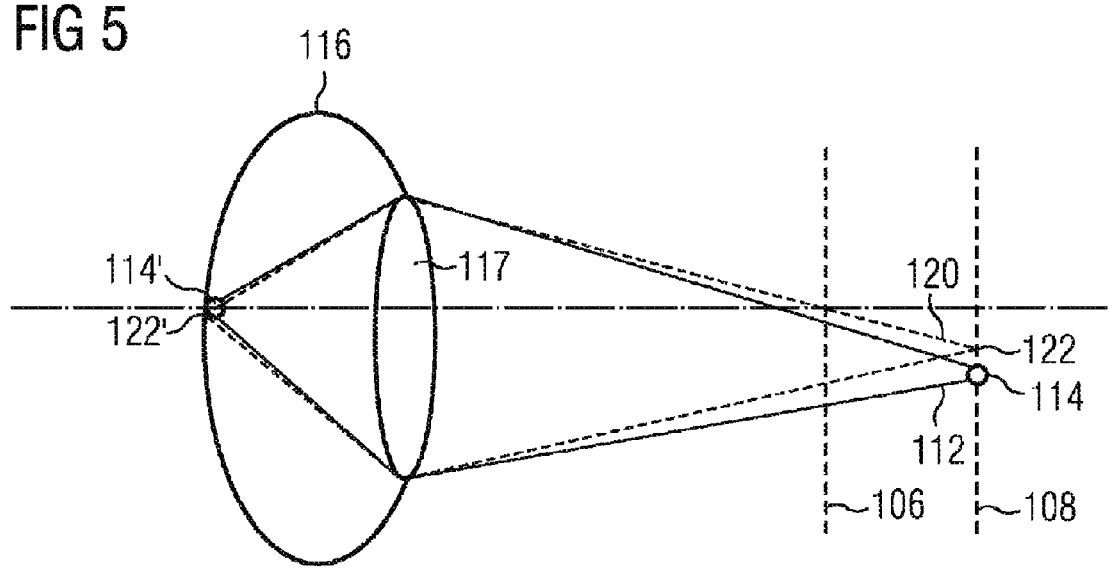
FIG. 5 shows an illustrative view of the eye of the long-sighted user, the plane at which the eye of the long-sighted user sees sharp and the display plane of the display of the display device.

FIG. 5 shows an illustrative view of the eye 116 of the long-sighted user, the plane 108 at which the eye of the long-sighted user sees sharp and the display plane 106 of the display 102 of the display device 100. In contrast to FIGS. 3 and 4, in FIG. 5 a second spot 122 having a second intensity and/or color, different from the first intensity and/or color of the first spot 114, is shown. The second spot 122 is located at a second position, different from the first position, at the plane 108 at which the eye 116 of the longsighted user sees sharp. In other words, FIG. 5 shows focusing on a second spot 122.

For example, the second spot 122 can be a dark spot or another colored spot. Second rays (e.g., dark or colored rays) which come from the second spot 122 (e.g., dark or colored spot) travel through the eyeball lens 117, wherein a different location 122' of the eyeball backplane will be reached by the second rays (e.g., dark or colored rays).

FIG. 6 shows an illustrative view of the eye 116 of the long-sighted user, the plane 108 at which the eye of the long-sighted user sees sharp and the display plane 106 of the display 102 of the display device 100. Translating the second spot 122 to the display plane 106 means that the display 102 should give second information (e.g., dark or colored information) from a larger region 118 as indicated in FIG. 6.

FIG. 7 shows an illustrative view of the eye 116 of the long-sighted user, the plane 108 at which the eye of the long-sighted user sees sharp and the display plane 106 of the display 102 of the display device 100. In FIG. 7, the first region 110 and the second region 118 overlap in an overlap region (or area). Pixels 104 of the display 102 which are located within this overlap region (or area) may be used to reproduce both, the first spot 114 and the second spot 122.

Normally, this is a contradiction for the display 102. From the same location on the display 102, the display should give the first information (e.g., light information) and the second information (e.g., dark or colored information). Actually, this contradiction is only virtual, because this contradiction can be solved by the method of angular dependent light emission of the display.

Subsequently, the angle of emission at the display 102 is described for one spot of the display 102. For that purpose in FIG. 7 a spot 126 is indicated. The spot 126 is located within the overlap area (or region) in which the first region 110 and the second region 118 overlap. Thereby, the spot 126 may cover at least one pixel 104.

Further, FIG. 7 shows a first information direction 127 (e.g., light ray direction) which lands on the eyes backplane. As shown in FIG. 7, from the same spot 126 also the second information (e.g., dark or colored information) may come.

Landing of the second information (e.g., dark or colored information) is on a different place at the eyes backplane. But this correlates to a different emission angle on display 102 of the display device 100. So the solution is an angular dependent light emission from the display 102 of the display device 100.

Figure 8:
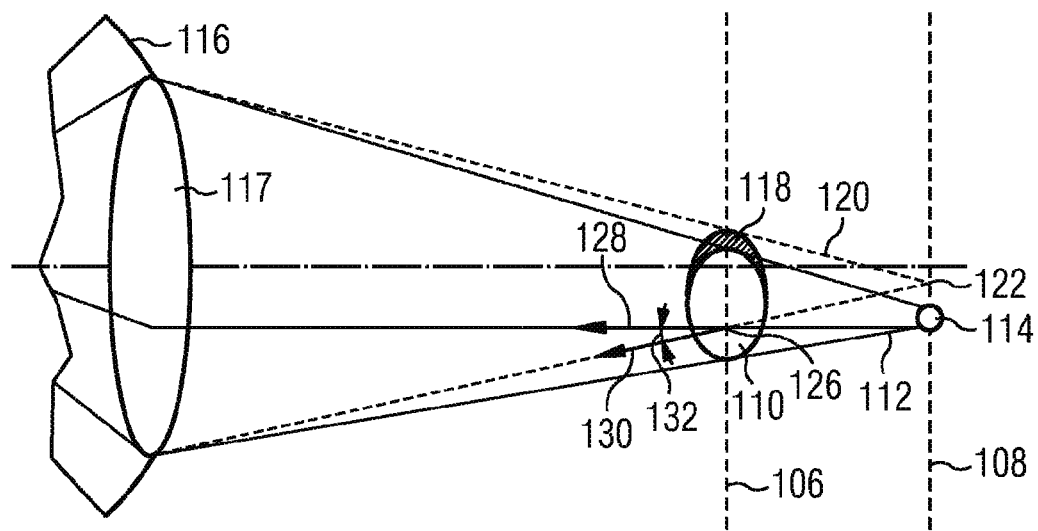
FIG. 8 shows an illustrative view of the eye of the long-sighted user, the plane at which the eye of the long-sighted user sees sharp and the display plane of the display of the display device.

FIG. 8 shows an illustrative view of the eye 116 of the long-sighted user, the plane 108 at which the eye of the long-sighted user sees sharp and the display plane 106 of the display 102 of the display device 100. Further in FIG. 8, the first direction 128, in which the spot 126 at the display 102 is supposed to emit the first information (e.g., light information), and the second direction 130, in which the spot 126 at the display 102 is supposed to emit the second information (e.g., dark or colored information), is shown. Moreover, an angle between the first direction 128 and the second direction 130 is indicated.

For example, a spatial-angular resolution of the display device emission in the range of the eye resolution on the display may be required, i.e., 0.05 mm at 100 cm (50-70 µm is hair thickness). This results at about 10 second of arc for the display 102 of the display device 100.

Note that FIG. 8 shows an example for two spots for illustration purposes. Naturally, the display device 100 can also be configured to display up n spots, wherein n is a natural number greater than or equal to two, i.e., n≥2, such as 10, 20, 30, 40, 50, 100, 200 or even more spots. For this purpose, the display device 100 can be configured to determine an i-th (1≤i≤n) contiguous group of pixels of the display which are located within an i-th optical path from an i-th virtual pixel of the virtual plane to an eye of the long-sighted user, and to adjust an intensity and a directivity of at least a portion of the i-th group of pixels corresponding to the i-th virtual pixel in an i-th direction defined by the i-th optical path.

In other words, the example shown in FIG. 8 can be extended up to n spots on a full display, so that the full display can provide (of display) a full image by angular dependent light emission based on each contiguous group of pixels (of n contiguous groups of pixels).

As already mentioned, the display device 100 shown in FIG. 1 utilizes the above described angular dependent light emission at the display 102 in order to compensate for human hyperopic (long-sighted) eye.

For that purpose, the display device 100 is configured to determine the virtual plane 108 at which the long-sighted user of the display device 100 who is looking at the display 102 sees sharp. The determined virtual plane 108 may correspond (or be equal) to the plane 108 at which the eye 116 of the long-sighted user sees sharp which is shown in FIGS. 2 to 8.

Further, the display device 100 is configured to determine the first contiguous group 110 of pixels 104 of the display 102 which are located within the first optical path 112 from the first virtual pixel 114 of the virtual plane 108 to the eye 116 of the long-sighted user. The first virtual pixel 114 may be an information to be displayed or reproduced via the display 102, such as the first spot 114 shown in FIGS. 2 to 8. Thereby, the first contiguous group 110 of the pixels can be the pixels of the display 102 which are located within the first area or region 110 shown in FIG. 4.

Similarly, the display device 100 is configured to determine the second contiguous group 118 of pixels 104 of the display 102 which are located within the second optical path 120 from the second virtual pixel 122 of the virtual plane 108 to the eye 116 of the long-sighted user. The second virtual pixel 122 may be information to be displayed or reproduced via the display 102, such as the second spot 114 shown in FIGS. 5 to 8. Thereby, the second contiguous group 118 of the pixels can be the pixels of the display 102 which are located within the second area or region 110 shown in FIG. 6.

Moreover, the display device 100 is configured to adjust an intensity and a directivity of at least a portion of the first contiguous group 110 of pixels 104 corresponding to the first virtual pixel 114 in a first direction defined by the first optical path 112 corresponding to the first virtual pixel 114 in the first direction defined by the first optical path 112. Thereby, the display 102 may reproduce the first information mentioned above by adjusting the intensity and directivity of at least a portion of the first contiguous group 110 of pixels 104. Moreover, the first direction may be the first direction 128 shown in FIG. 8.

Just as well, the display device 100 is configured to adjust an intensity and a directivity of at least a portion of the second contiguous group 118 of pixels 104 corresponding to the second virtual pixel 122 in a second direction defined by the second optical path 120 corresponding to the second virtual pixel 122 in the second direction defined by the second optical path 120. Thereby, the display 102 may reproduce the second information mentioned above by adjusting the intensity and directivity of at least a portion of the second contiguous group 118 of pixels 104. Moreover, the second direction may be the second direction 130 shown in FIG. 8.

The display device 100 can be is a monitor, a television, a smartphone, a tablet PC, a portable PC or a PC.

For example, the display device can be used for smartphones, tablet PCs and even standard PCs. Medical applications are also possible. For example, an eye specialist can determine the visual acuity by software defocusing on a tablet PC itself. So there is no need for a far distant wall anymore.

Further, the display device 100 can comprise a focus control element 125 (e.g., a button or slider) for adjusting a focus of the display device 100 (see FIG. 1). Thereby, the display device 100 can be configured to adjust a position of the virtual plane 108 in response to an adjustment of the focus via the focus control element 125.

Moreover, the display device 100 can comprise a dioptre control element 125 (e.g., a button or slider) for setting a dioptre value. Thereby, the display device 100 can be configured to determine the virtual plane 108 based on the set dioptre value.

In other words, additional to the angular dependent light emission a slider 125 on the display can be implemented. Such slider can allow continuously adapting different dioptrens, simply by sliding up/down. So the user can easily adjust to its individual visual acuity.

Figure 9:
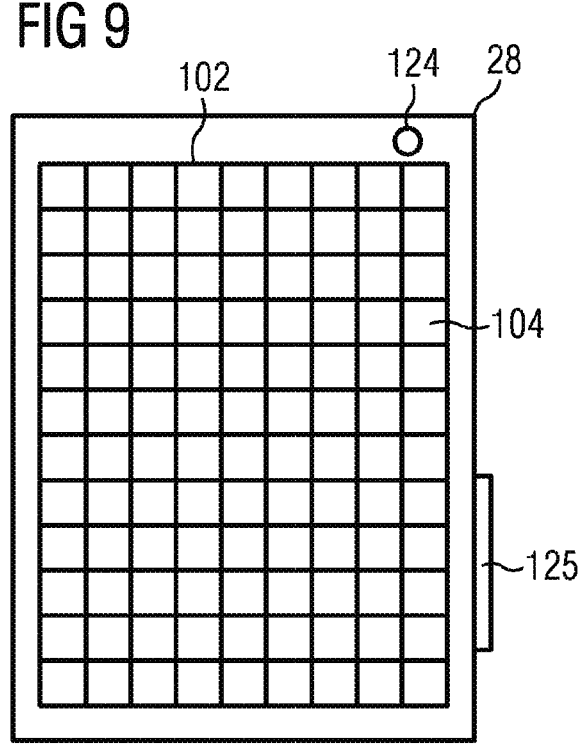
FIG. 9 shows an illustrative view of a portable device.

FIG. 9 shows an illustrative view of a portable device 180. The portable device 180 comprises the above described display device 100 comprising the display 102 having the plurality of pixels 104. The portable device 180 can be a smartphone, a tablet PC or notebook. As shown in FIG. 9, the plurality of pixels 104 can be arranged in a two-dimensional array.

Further, the portable device 180 can comprise the above described sensor 124, the above described dioptre control element 125 and/or the above described focus control element 125.

FIG. 10a shows an exemplary image of a conventional smartphone 170 from the view of a normal-sighted eye.

FIG. 10b shows an exemplary image of the conventional smartphone 170 from the view of a long-sighted eye. In other words, FIG. 10b shows a standard not-sharp situation of hyperopic-eye.

FIG. 10c shows an exemplary image of a smartphone implementation of the portable device 180 shown in FIG. 9. The advantage is evident. Despite the fact that the background still is not sharp, everything on the display 102 of the portable device 180 is clearly readable. Everything on the display 102 can be seen with an increased (or even maximum) resolution. The display device 100 of the portable device 180 solves this by utilizing angular dependent light emission at the display 102.

FIG. 11 shows a flowchart of a method 200 for operating a display device. The display device comprises a display comprising a plurality of pixels arranged in a display plane. The method comprises determining 202 a virtual plane at which a long-sighted user of the display device who is looking at the display sees sharp. Further, the method 200 comprises determining 204 a first contiguous group of pixels of the display which are located within a first optical path from a first virtual pixel of the virtual plane to an eye of the long-sighted user, and determining 206 a second contiguous group of pixels of the display which are located within a second optical path from a second virtual pixel of the virtual plane to the eye of the long-sighted user. Further, the method 200 comprises adjusting 208 an intensity and a directivity of at least a portion of the first group of pixels corresponding to the first virtual pixel in a first direction defined by the first optical path, and adjusting 210 an intensity and a directivity of at least a portion of the second group of pixels corresponding to the second virtual pixel in a second direction, different from the first direction, defined by the second optical path.

FIG. 12 shows a flowchart of a method 220 for determining a dioptre value of a long-sighted person using a display device. The display device comprises a display comprising a plurality of pixels arranged in a display plane. The method 220 comprises determining 222 a virtual plane at which the long-sighted person who is looking at the display is expected to see sharp. Further, the method 220 comprises determining 224 a first contiguous group of pixels of the display which are located within a first optical path from a first virtual pixel of the virtual plane to an eye of the long-sighted person, and determining 226 a second contiguous group of pixels of the display which are located within a second optical path from a second virtual pixel of the virtual plane to the eye of the long-sighted person. Further, the method 220 comprises adjusting 228 an intensity and a directivity of at least a portion of the first group of pixels corresponding to the first virtual pixel in a first direction defined by the first optical path, and adjusting 230 an intensity and a directivity of at least a portion of the second group of pixels corresponding to the second virtual pixel in a second direction, different from the first direction, defined by the second optical path. Further, the method 220 comprises adjusting 232 a position of the virtual plane until the long-sighted person sees sharp the first pixel and the second pixel. Further, the method 220 comprises providing 234 the dioptre value based on the adjusted position of the virtual plane.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like a microprocessor, a programmable computer or an electronic circuit. Some one or more of the most important method steps may be executed by such an apparatus.

The implementation may be in hardware or in software or may be performed using a digital storage medium, for example, a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. A data carrier may be provided which has electronically readable control signals, which are capable of cooperating with a programmable computer system, such that the method described herein is performed.

The implementation may also be in the form of a computer program product with a program code, the program code being operative for performing the method when the computer program product runs on a computer. The program code may be stored on a machine readable carrier.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

What is claimed is:

1. A display device comprising:
    a display comprising a plurality of pixels arranged in a display plane, wherein the display device is configured to:
        determine a virtual plane at which a long-sighted user of the display device who is looking at the display sees sharp;
        determine a first contiguous group of pixels of the display which are located within a first optical path from a first virtual pixel of the virtual plane to an eye of the long-sighted user;
        determine a second contiguous group of pixels of the display which are located within a second optical path from a second virtual pixel of the virtual plane to the eye of the long-sighted user;
        adjust an intensity and a directivity of at least a portion of the first group of pixels corresponding to the first virtual pixel in a first direction defined by the first optical path; and
        adjust an intensity and directivity of at least a portion of the second group of pixels corresponding to the second virtual pixel in a second direction, different from the first direction, defined by the second optical path,
        wherein the display plane and the virtual plane are different,
        wherein the first contiguous group of pixels of the display comprises more than one pixel, and wherein the second contiguous group of pixels of the display comprises more than one pixel.

2. The display device according to claim 1, wherein the display device comprises a focus control element for adjusting a focus of the display device, wherein the display device is configured to adjust a position of the virtual plane in response to an adjustment of the focus via the focus control element.

3. The display device according to claim 1, wherein the display device comprises a sensor for detecting a position of the eye of the long-sighted user of the display device, and wherein the display device is configured to determine the first optical path and the second optical path based on the detected position of the eye of the long-sighted user.

4. The display device according to claim 1, wherein the plurality of pixels are arranged in a two-dimensional array.

5. The display device according to claim 1, wherein the display device is configured to determine the virtual plane such that the display plane and the virtual plane are parallel to each other.

6. The display device according to claim 1, wherein the display device is configured to adjust the intensity and the directivity of at least the portion of the first group of pixels during a first time period, and wherein the display device is configured to adjust the intensity and the directivity of at least the portion of the second group of pixels during a second time period, different from the first time period.

7. The display device according to claim 1, wherein the display device is a monitor, a television, a smartphone, a tablet PC, a portable PC or a PC.

8. A portable device comprising a display device, the portable device comprising:
    a display comprising a plurality of pixels arranged in a display plane, wherein the display device is configured to:
        determine a virtual plane at which a long-sighted user of the display device who is looking at the display sees sharp;
        determine a first contiguous group of pixels of the display which are located within a first optical path from a first virtual pixel of the virtual plane to an eye of the long-sighted user;
        determine a second contiguous group of pixels of the display which are located within a second optical path from a second virtual pixel of the virtual plane to the eye of the long-sighted user;
        adjust an intensity and a directivity of at least a portion of the first group of pixels corresponding to the first virtual pixel in a first direction defined by the first optical path; and
        adjust an intensity and directivity of at least a portion of the second group of pixels corresponding to the second virtual pixel in a second direction, different from the first direction, defined by the second optical path,
    wherein the first contiguous group of pixels of the display comprises more than one pixel, and wherein the second contiguous group of pixels of the display comprises more than one pixel.

9. The portable device according to claim 8, wherein the portable device comprises focus control element for adjusting a focus of the display, wherein the display device is configured to determine the virtual plane based on the adjusted focus.

10. The portable device according to claim 8, wherein the portable device is a smartphone, a tabled PC or notebook.

11. A method for operating a display device, wherein the display device comprises a display having a plurality of pixels arranged in a display plane, the method comprising:
    determining a virtual plane at which a long-sighted user of the display device who is looking at the display sees sharp;
    determining a first contiguous group of pixels of the display which are located within a first optical path from a first virtual pixel of the virtual plane to an eye of the long-sighted user;
    determining a second contiguous group of pixels of the display which are located within a second optical path from a second virtual pixel of the virtual plane to the eye of the long-sighted user;
    adjusting an intensity and a directivity of at least a portion of the first group of pixels corresponding to the first virtual pixel in a first direction defined by the first optical path; and
    adjusting an intensity and a directivity of at least a portion of the second group of pixels corresponding to the second virtual pixel in a second direction, different from the first direction, defined by the second optical path,
    wherein the display plane and the virtual plane are different,
    wherein the first contiguous group of pixels of the display comprises more than one pixel, and wherein the second contiguous group of pixels of the display comprises more than one pixel.

12. A non-transitory storage medium having stored thereon a computer program having a program code for performing, when running on a computer or microprocessor, a method for operating a display device, wherein the display device comprises a display having a plurality of pixels arranged in a display plane, the method comprising:
    determining a virtual plane at which a long-sighted user of the display device who is looking at the display sees sharp;
    determining a first contiguous group of pixels of the display which are located within a first optical path from a first virtual pixel of the virtual plane to an eye of the long-sighted user;
    determining a second contiguous group of pixels of the display which are located within a second optical path from a second virtual pixel of the virtual plane to the eye of the long-sighted user;
    adjusting an intensity and a directivity of at least a portion of the first group of pixels corresponding to the first virtual pixel in a first direction defined by the first optical path; and
    adjusting an intensity and a directivity of at least a portion of the second group of pixels corresponding to the second virtual pixel in a second direction, different from the first direction, defined by the second optical path,
    wherein the display plane and the virtual plane are different,
    wherein the first contiguous group of pixels of the display comprises more than one pixel, and wherein the second contiguous group of pixels of the display comprises more than one pixel.

\* \* \* \* \*